United States Patent
Park et al.

(10) Patent No.: US 9,071,869 B2
(45) Date of Patent: Jun. 30, 2015

(54) BROADCASTING RECEIVING APPARATUS AND METHOD FOR PROVIDING BROADCASTING SIGNAL RELATION INFORMATION

(71) Applicant: SAMSUNG ELECTRONICS CO., LTD., Suwon-si (KR)

(72) Inventors: Tae-suh Park, Yongin-si (KR); Ki-ho Kim, Seongnam-si (KR); Eun-seok Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/294,135

(22) Filed: Jun. 2, 2014

(65) Prior Publication Data

US 2014/0282675 A1 Sep. 18, 2014

Related U.S. Application Data

(63) Continuation of application No. 13/617,373, filed on Sep. 14, 2012, now Pat. No. 8,756,623.

(30) Foreign Application Priority Data

Sep. 27, 2011 (KR) .................. 10-2011-0097741

(51) Int. Cl.
*H04H 60/32* (2008.01)
*H04N 21/442* (2011.01)
(Continued)

(52) U.S. Cl.
CPC ....... *H04N 21/442* (2013.01); *H04N 21/44222* (2013.01); *H04N 21/8358* (2013.01);
(Continued)

(58) Field of Classification Search
CPC ................................................. H04N 21/44008
USPC ..................... 725/14, 16, 19, 49, 43
See application file for complete search history.

(56) References Cited

U.S. PATENT DOCUMENTS

| 6,088,455 A | 7/2000 | Logan et al. |
| 7,975,062 B2 | 7/2011 | Krikorian et al. |

(Continued)

FOREIGN PATENT DOCUMENTS

| EP | 1 653 381 A2 | 5/2006 |
| GB | 2472531 A | 2/2011 |

(Continued)

OTHER PUBLICATIONS

Communication dated Nov. 12, 2012 issued by the International Searching Authority in International Application No. PCT/KR2012/003441.

(Continued)

*Primary Examiner* — Hunter B Lonsberry
(74) *Attorney, Agent, or Firm* — Sughrue Mion, PLLC

(57) ABSTRACT

A broadcasting receiving apparatus and a method for providing broadcasting signal relation information are provided. The broadcasting receiving apparatus, which accesses a server through a network, includes a broadcasting signal receiver which receives a broadcasting signal; a channel identifier which identifies a change of a channel of the broadcasting signal, generates a fingerprint corresponding to the broadcasting signal of the changed channel, and receives identification information of the changed channel from a matching server based on the generated fingerprint; and a relevant information provider which receives conditional information that indicates a condition for receiving relevant information of the broadcasting signal if the channel is changed, receives the relevant information based on the conditional information and displays the received relevant information.

26 Claims, 7 Drawing Sheets

(51) Int. Cl.
  *H04N 21/8358* (2011.01)
  *H04H 60/37* (2008.01)
  *H04H 60/74* (2008.01)
  *H04H 60/76* (2008.01)
  *H04H 60/15* (2008.01)
  *H04H 60/43* (2008.01)
  *H04H 60/59* (2008.01)
  *H04H 60/64* (2008.01)

(52) U.S. Cl.
  CPC ............ *H04H60/372* (2013.01); *H04H 60/74* (2013.01); *H04H 60/76* (2013.01); *H04H 60/15* (2013.01); *H04H 60/43* (2013.01); *H04H 60/59* (2013.01); *H04H 60/64* (2013.01)

(56) References Cited

U.S. PATENT DOCUMENTS

| | | | | |
|---|---|---|---|---|
| 8,756,623 | B2 * | 6/2014 | Park et al. | ............ 725/19 |
| 2001/0001160 | A1 | 5/2001 | Shoff et al. | |
| 2001/0001166 | A1 | 5/2001 | Ladouceur et al. | |
| 2004/0199387 | A1 | 10/2004 | Wang et al. | |
| 2007/0006260 | A1 | 1/2007 | Yoon et al. | |
| 2008/0059999 | A1 | 3/2008 | Winans et al. | |
| 2008/0221942 | A1 | 9/2008 | Agnihotri et al. | |
| 2008/0285890 | A1 | 11/2008 | Han et al. | |
| 2009/0247135 | A1 | 10/2009 | Yuki | |
| 2010/0036812 | A1 | 2/2010 | Choi et al. | |
| 2011/0007212 | A1 | 1/2011 | Lee et al. | |
| 2011/0016415 | A1 | 1/2011 | Nam et al. | |

FOREIGN PATENT DOCUMENTS

| | | |
|---|---|---|
| JP | 2011-41053 A | 2/2011 |
| KR | 1020090043526 A | 5/2009 |
| KR | 10-2010-0054297 A | 5/2010 |
| KR | 10-2011-0005456 A | 1/2011 |
| KR | 10-2011-0006305 A | 1/2011 |

OTHER PUBLICATIONS

Communication dated Aug. 22, 2013 issued by the European Patent Office in counterpart European Patent Application No. 12165115.2.

Communication dated Sep. 10, 2013 issued by the U.S. Patent and Trademark Office in counterpart U.S. Appl. No. 13/533,597.

Communication dated Apr. 4, 2014, issued by the United States Patent and Trademark Office in counterpart U.S. Appl. No. 13/533,597.

Communication, Issued by the United States Patent and Trademark Office, Dated Oct. 23, 2014, in counterpart U.S. Appl. No. 13/533,597.

Communication dated Mar. 23, 2015 issued by the United States Patent and Trademark Office in counterpart U.S. Appl. No. 13/533,597.

* cited by examiner

FIG. 3

| BROADCASTING STATION ID | EXECUTION CONDITION | APPLICATION ID | RELEVANT INFORMATION SOURCE INFORMATION |
|---|---|---|---|

* PROGRAM ID/CHANNEL IDENTIFICATION INFORMATION
* PROGRAM BROADCASTING TIME
* BROADCASTING SIGNAL FEATURE INFORMATION

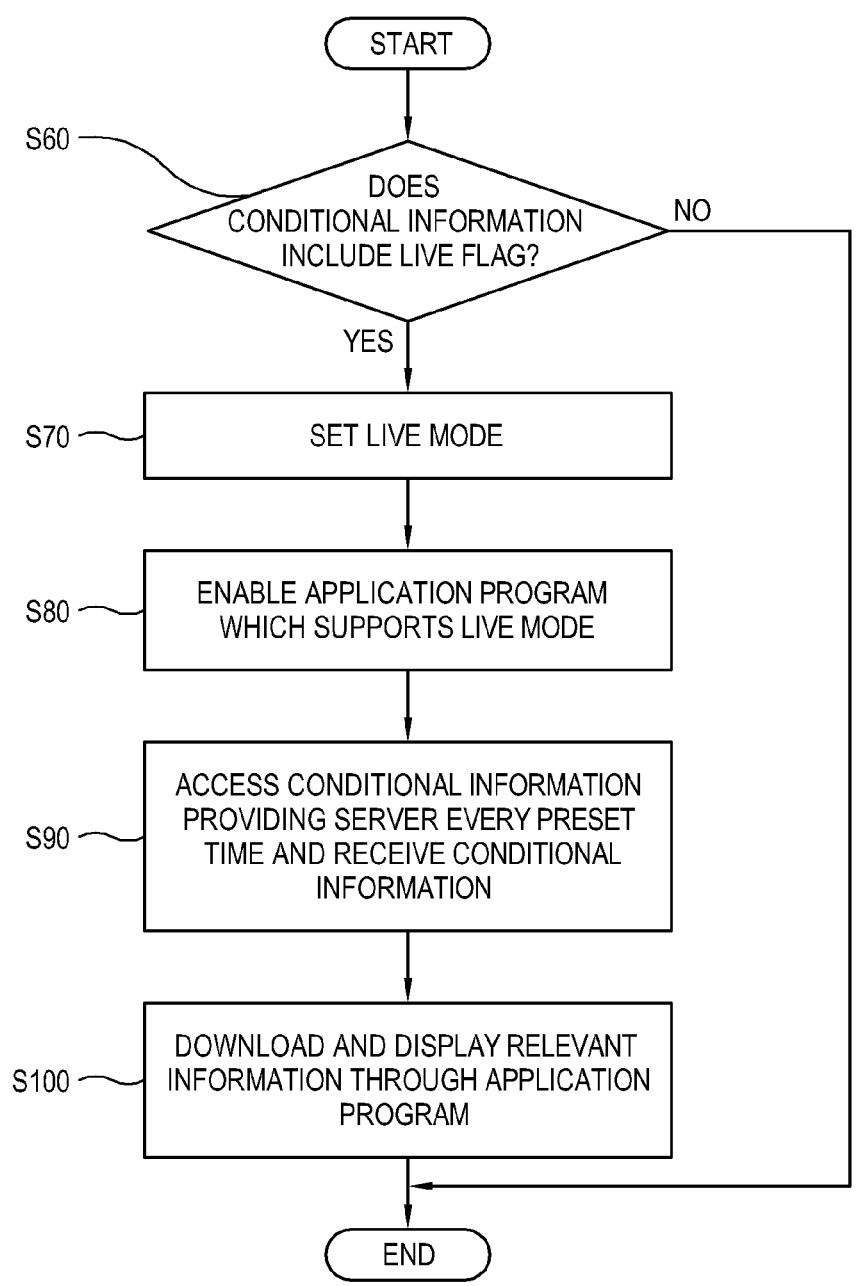

BROADCASTING RECEIVING APPARATUS AND METHOD FOR PROVIDING BROADCASTING SIGNAL RELATION INFORMATION

CROSS-REFERENCE TO RELATED APPLICATION

This application is a Continuation of U.S. patent application Ser. No. 13/617,373, filed on Sep. 14, 2012, which claims priority from Korean Patent Application No. 10-2011-0097741, filed on Sep. 27, 2011 in the Korean Intellectual Property Office, the disclosure of which is herein incorporated by reference.

BACKGROUND

1. Field

Apparatuses and methods consistent with the exemplary embodiments relate to a broadcasting receiving apparatus and a method for providing broadcasting signal relation information.

2. Description of the Related Art

Media contents denotes information which may be provided on the basis of media such as airwave broadcasting, satellite broadcasting, cable broadcasting, Internet broadcasting, digital multimedia broadcasting and storage media such as Blu-ray and DVD. The media contents may be provided in the form of audio and/or video (or images) and/or text, and may be referred to as broadcasting contents or multimedia contents.

As the broadcasting contents are most accessible among the media contents, providing a user with relevant information corresponding to the broadcasting contents such as contents guide information, location information, product information, actor/actress information, artist information, banner advertisement information, advertiser information, media contents purchase information and event information in real-time has emerged as a service.

If devices which play broadcasting contents do not have the function of providing the relevant information, the user must obtain such information by web surfing with respect to the broadcasting contents known to a user by using an Internet-accessible device.

In such a case, however, a user may not obtain in real-time the relevant information synchronized with the broadcasting contents which are currently played. Additionally, web surfing relies on the information that a user is aware of, and the information relating to the media contents therefore may be limited.

SUMMARY

Accordingly, an aspect of one or more exemplary embodiments is to provide a broadcasting receiving apparatus and a method for providing broadcasting signal relation information which displays relevant information corresponding to a broadcasting signal in real-time.

Another aspect of one or more exemplary embodiments is to provide a broadcasting receiving apparatus and a method for providing broadcasting signal relation information which provides relevant information of a broadcasting signal even if a broadcasting program is not identified from the broadcasting signal.

Another aspect of one or more exemplary embodiments is to provide a broadcasting receiving apparatus and a method for providing broadcasting signal relation information which provides relevant information of a broadcasting signal by reducing a data traffic with a matching server that identifies a channel.

Another aspect of one or more exemplary embodiments is to provide a broadcasting receiving apparatus and a method for providing broadcasting signal relation information which provides relevant information of a live broadcasting signal or unpredictable broadcasting signal.

The foregoing and/or other aspects may be achieved by providing a broadcasting receiving apparatus which accesses a server through a network, the broadcasting receiving apparatus including a broadcasting signal receiver which receives a broadcasting signal; a channel identifier which identifies a change of a channel of the broadcasting signal, generates a fingerprint corresponding to the broadcasting signal of the changed channel, and receives identification information of the changed channel from a matching server based on the generated fingerprint; and a relevant information provider which receives conditional information that indicates a condition for receiving relevant information of the broadcasting signal if the channel is changed, receives the relevant information based on the conditional information and displays the received relevant information.

The channel identifier may calculate an entropy of an image frame of a broadcasting signal that is captured at a predetermined interval, determine that the image frame is a dummy frame if the calculated entropy is out of a threshold range, and determine that the channel has been changed if an entropy of an image frame following the dummy frame is within the threshold range.

After the channel is changed, conditional information corresponding to a predetermined search period may be received.

If the predetermined search period elapses, conditional information corresponding to a next search period may be received.

The conditional information may include a server address for a relevant information providing server that provides the relevant information.

The conditional information may further include channel information of a broadcasting signal, and the relevant information provider may extract the server address corresponding to the broadcasting signal that is currently displayed, by comparing the received channel information and the identification information.

The broadcasting receiving apparatus may further include an information receiver which receives the conditional information from the conditional information providing server and receives the relevant information from the relevant information providing server.

If the conditional information includes a live flag that indicates a live broadcasting or an unpredictable broadcasting signal, the relevant information provider may request the conditional information every preset time, and receive and display relevant information corresponding to a broadcasting signal of a current channel by using the received conditional information.

If the conditional information includes a live flag that indicates a live broadcasting or an unpredictable broadcasting signal, the relevant information provider may request a relevant information providing server providing the relevant information to provide the relevant information every preset time.

The foregoing and/or other aspects may be achieved by providing a method for providing relevant information which provides relevant information of a broadcasting signal, the method including identifying a change of a channel of a broadcasting signal; generating a fingerprint corresponding to a broadcasting signal of the changed channel; receiving identification information of the changed channel from a matching server based on the generated fingerprint; receiving conditional information which indicates a condition for receiving relevant information of a broadcasting signal; and receiving the relevant information based on the conditional information and displaying the received relevant information.

The identifying the change of the channel may include calculating an entropy of an image frame of a broadcasting signal that is captured at a preset interval; determining that the image frame is a dummy frame if the calculated entropy is out of a threshold range; and determining that the channel has been changed if an entropy of an image frame following the dummy frame is within the threshold range.

The receiving the conditional information may include requesting conditional information corresponding to a predetermined search period after the change of the channel.

The method may further include requesting conditional information corresponding to a next search period if the predetermined search period elapses.

The conditional information may include a server address of a relevant information providing server providing the relevant information, and channel information of a broadcasting signal, and the displaying the relevant information may include extracting the server address corresponding to a broadcasting signal that is currently displayed, by comparing the received channel information and the identification information.

The receiving the conditional information may include requesting the conditional information every preset time if the conditional information includes a live flag which indicates a live broadcasting or an unpredictable broadcasting signal.

The receiving the conditional information may include requesting a relevant information providing server providing the relevant information to provide the relevant information every preset time if the conditional information includes a live flag which indicates a live broadcasting or an unpredictable broadcasting signal.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 3 illustrates conditional information which is transmitted to the broadcasting receiving apparatus in FIG. 1;

FIG. 7 is a control flowchart showing a method for providing relevant information by the broadcasting receiving apparatus in FIG. 6.

DETAILED DESCRIPTION

Figure 1:
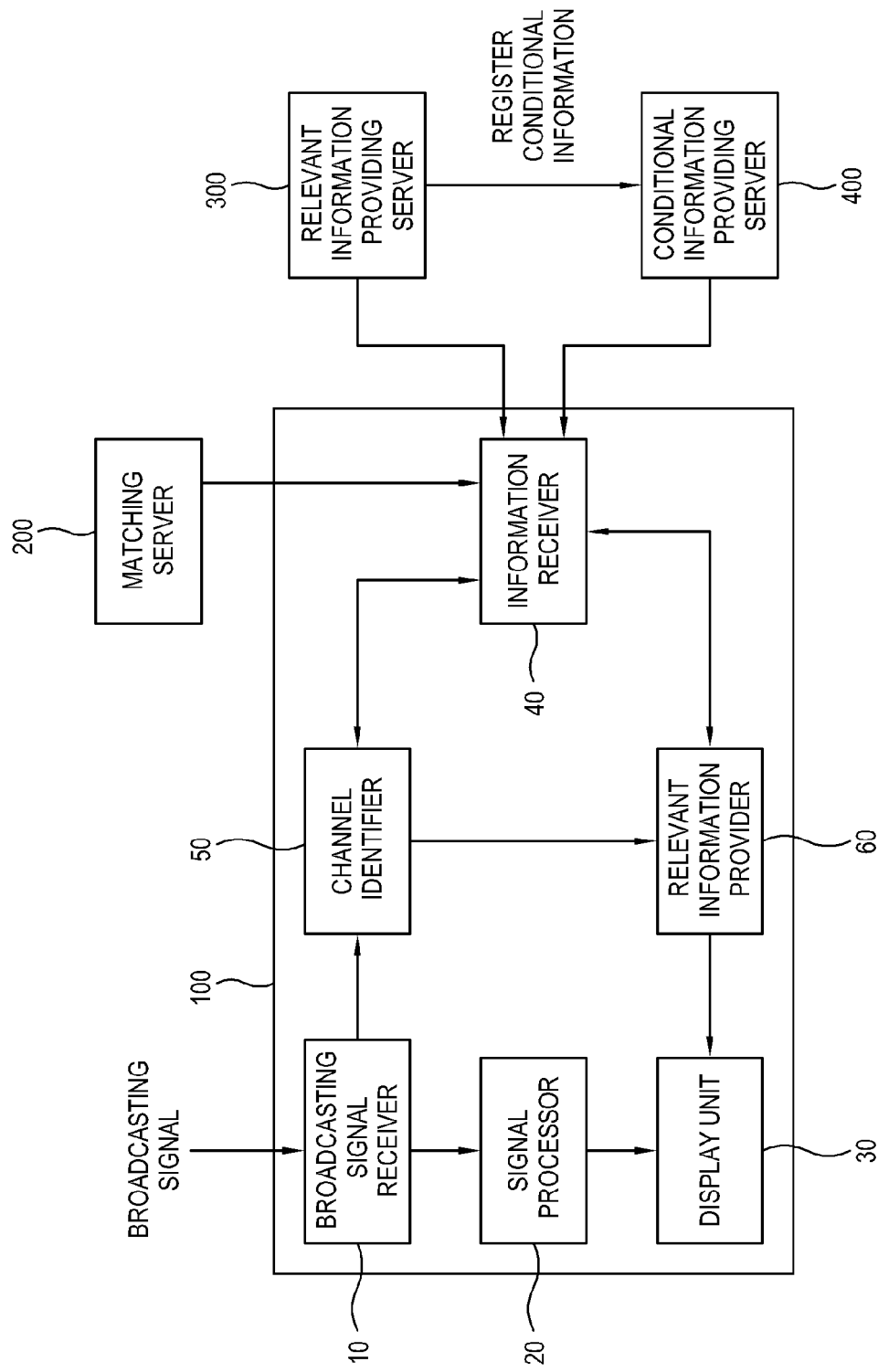
FIG. 1 is a control block diagram of a system which includes a broadcasting receiving apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a control block diagram of a system which includes a broadcasting receiving apparatus according to an exemplary embodiment.

As shown in FIG. 1, a broadcasting receiving apparatus 100 according to the present exemplary embodiment communicates with a matching server 200, a relevant information providing server 300 and a conditional information providing server 400. The broadcasting receiving apparatus 100 includes a broadcasting signal receiver 10 and an information receiver 40. The matching server 200, the relevant information providing server 300 and the conditional information providing server 400 communicate with the information receiver 40 and provide the broadcasting receiving apparatus 100 with identification information, relevant information and conditional information of a channel. The matching server 200 is a server which provides the broadcasting receiving apparatus 100 with program identification information or channel identification information to identify a channel of a broadcasting signal that is currently received. The relevant information providing server 300 corresponds to a server which provides relevant information corresponding to a broadcasting program included in a broadcasting signal, and the conditional information providing server 400 provides the broadcasting receiving apparatus 100 with conditional information as a condition to provide the relevant information.

The matching server 200 receives a broadcasting signal including a broadcasting program, generates a fingerprint corresponding to the broadcasting signal and transmits to the broadcasting receiving apparatus 100 identification information for a channel of the broadcasting signal corresponding to a fingerprint that matches a fingerprint transmitted by the broadcasting receiving apparatus 100. The matching server 200 receives a broadcasting signal at a predetermined time prior to a broadcasting signal received from the broadcasting receiving apparatus 100 and generates a fingerprint of the broadcasting signal. The fingerprint denotes a data value or calculation value that is used to identify a video frame and may be generated by processing an existing known digital signal. For example, the matching server 200 may generate a digital fingerprint of a video frame by using a feature extracting algorithm such as a scale invariant feature transform (SIFT), speed up robust feature (SURF) and maximum stable extremal regions (MSER).

The relevant information may include an advertisement relating to a broadcasting program, a user interface (UI) for conducting a survey relating to a broadcasting program, broadcasting program guide information, performance information, and various local information such as amenities, transportation information and restaurant information for a particular region if a broadcasting program is a particular local broadcasting, or information of plot or actors of a movie if the movie is broadcast, or usage information of a particular product. Accordingly, the relevant information providing server 300 may include a server of a broadcasting station, advertiser, municipal organization, product manufacturer or movie production which may provide the foregoing information. The relevant information providing server 300 may include a server of the relevant information provider or an intermediate server which receives relevant information from the providers and provides the relevant information to the broadcasting receiving apparatus 100. The relevant information providing server 300 may be provided solely as in FIG. 1 or plurally.

The conditional information providing server 400 receives conditional information from the relevant information providing server 300 and supplies the conditional information to the broadcasting receiving apparatus 100. The conditional information providing server 400 may include a storage unit (not shown) which stores therein conditional information corresponding to a broadcasting program that is registered by a content provider such as the relevant information providing server 300, and a communication unit (not shown) which provides the registered conditional information to the broadcasting receiving apparatus 100 at the request of the broadcasting receiving apparatus 100. The conditional information may be provided to the broadcasting receiving apparatus 100 on a regular basis or corresponding to a particular event. For example, the broadcasting receiving apparatus 100 may receive conditional information by accessing the conditional information providing server 400 at an interval corresponding to a renewal period or by accessing the conditional information providing server 400 whenever a channel of a broadcasting signal is changed. The conditional information may be downloaded to the broadcasting receiving apparatus 100 by the broadcasting receiving apparatus 100 or supplied to the broadcasting receiving apparatus 100 by the conditional information providing server 400.

The relevant information providing server 300 and the conditional information providing server 400 may be operated by a single provider and the conditional information and the relevant information may be provided by a single server.

The broadcasting receiving apparatus 100 includes a broadcasting signal receiver 10, a signal processor 20, a display unit 30, an information receiver 40, a channel identifier 50 and a relevant information provider 60. The broadcasting receiving apparatus 100 may include a device such as a computer, or a mobile device that receives and plays a broadcasting signal, or a TV which may be connected to a wired/wireless network. The mobile device may include a portable device such as a mobile phone, smart phone, iPhone, personal digital assistant (PDA), portable multi-media player (PMP) and a navigation device. The TV may be included in a mobile device or include a device such as Internet Protocol TV (IPTV) or digital multi-media broadcasting terminal. The broadcasting receiving apparatus 100 may be referred to as a user device. The broadcasting receiving apparatus 100 may further include a storage unit (not shown) or a user input unit such as a button, input pad or remote controller.

The broadcasting signal receiver 10 receives a broadcasting signal through an intermediate medium such as a set-top box (not shown) and includes a wired/wireless interface to perform the foregoing operation. If the broadcasting receiving apparatus 100 receives a broadcasting signal through a set-top box, a sound signal and image signal which are included in the broadcasting signal are input to, and played by, the broadcasting receiving apparatus 100, but other information such as electronic program guide (EPG) information or broadcasting meta information is not input to the broadcasting receiving apparatus 100. If reception/non-reception of other information is not guaranteed because there is no clear standard for data transmission between the set-top box and broadcasting receiving apparatus 100, the broadcasting receiving apparatus 100 does not use the other information, nor identify a broadcasting program that is currently received.

The signal processor 20 performs an image processing operation to process a received broadcasting signal and display the broadcasting signal on the display unit 30. The signal processor 20 may include an image processor (not shown) and a sound processor (not shown) to perform demultiplexing, decoding, scaling, picture quality-adjusting and picture quality-improving operations.

The display unit 30 displays thereon a broadcasting signal that is processed by the signal processor 20, and relevant information provided by the relevant information provider 60 (to be described later). The display unit 30 may include a liquid crystal display (LCD) panel including liquid crystal, an organic light emitting diode (OLED) panel including organic light emitting element, plasma display panel (PDP), flexible display, or 3D display, and a panel driver to drive the panel.

The information receiver 40 denotes an interface which receives various information and contents through a web network such as the Internet, and according to the present exemplary embodiment, receives identification information, relevant information and conditional information of a channel. The information receiver 40 according to the present exemplary embodiment is indicated as a single block to explain a configuration of receiving a signal other than a broadcasting signal received by the broadcasting signal receiver 10 in a functional manner. Accordingly, the information receiver 40 may be plurally provided according to the type of received information and the nature of server.

As described above, if the broadcasting signal receiver 10 receives a broadcasting signal from a set-top box, the broadcasting receiving apparatus 100 identifies a broadcasting signal that is currently received, to receive additional service such as relevant information. To do the foregoing, the channel identifier 50 identifies a change of a channel of a broadcasting signal, generates a fingerprint corresponding to a broadcasting signal of a changed channel, and receives identification information of a changed channel from the matching server 200 that stores therein a fingerprint corresponding to the broadcasting signal by receiving the broadcasting signal in advance with the generated fingerprint.

Figure 2:
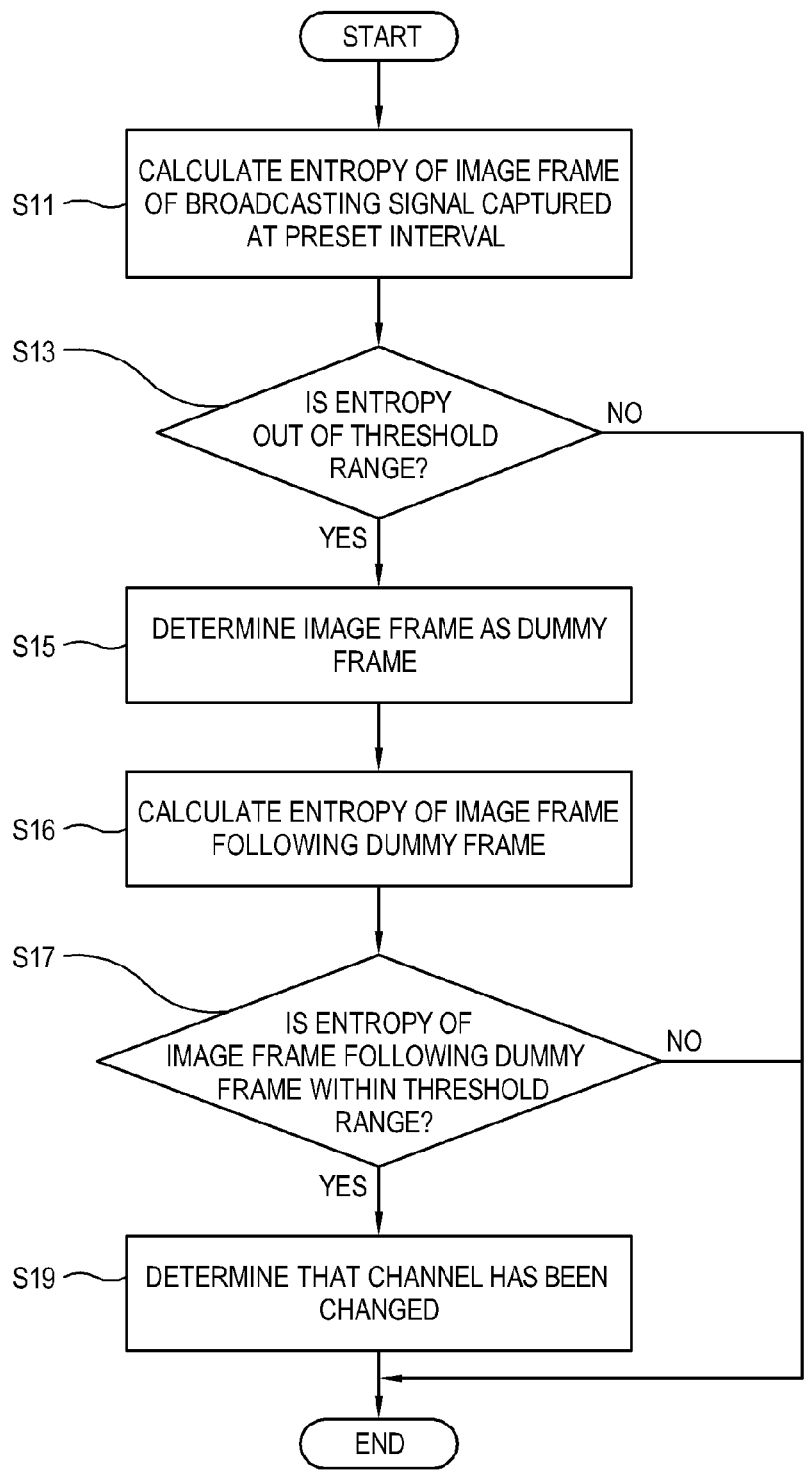
FIG. 2 is a control flowchart for identifying a change of a channel in the broadcasting receiving apparatus in FIG. 1.

FIG. 2 illustrates an operation of identifying the change of a channel by the channel identifier 50. The channel identifier 50 calculates an entropy of an image frame of a broadcasting signal that is captured at a preset interval (S11). The entropy of the image frame may be calculated from an entire image, or generated on the basis of a part of an image in a central area or in a particular area. The preset interval may be set as several hundreds of milliseconds (ms), e.g., 250 ms. In the case of a monotonous image such as a black or white image, the entropy has a lower value, and a noise screen has a high entropy. If a channel is changed, a dummy frame such as a black screen, a blank screen, or a noise screen may typically be inserted among the image frames. The channel identifier 50 may determine change/non-change of a channel by identifying the dummy frame.

It is determined whether the calculated entropy is out of a threshold range (S13). The threshold range may be set as a particular value or less, or a particular value or more. The threshold range may depend on the inserted dummy frame. As the calculated entropy may be a negative or positive value, an absolute value of the entropy may be used to be compared with the threshold range.

If the entropy is not out of the threshold range (S13: NO), the channel identifier 50 determine that the image is not a dummy frame, and the process ends. Alternatively, if the entropy is out of the threshold range (S13: YES), the channel identifier 50 determines that the image is a dummy frame (S15).

The channel identifier 50 calculates the entropy of an image frame following the dummy frame (S16), and determines whether the entropy of the image frame following the dummy frame is within the threshold range (S17). If it is determined that the entropy of the image frame following the dummy frame is out of the threshold range (S17: NO), the process ends. Alternatively, if it is determined that the entropy of the image frame following the dummy frame is within the threshold range, i.e., the image frame is not a dummy frame (S17: YES), the channel identifier 50 determines that the channel has been changed (S19).

If a channel or broadcasting signal is identified by using a fingerprint, the broadcasting receiving apparatus 100 typically communicates with the matching server 200 once during a predetermined time, for example, once every approximately 2 to 3 seconds. The broadcasting receiving apparatus 100 which desires to receive more information relating to the broadcasting signal communicates more often with the matching server 200 to identify the broadcasting signal. This more frequent communication causes an increase in the quantity of communication between the broadcasting receiving apparatus 100 and matching server 200, and an increase in usage of the network. Thus, from the perspective of the matching server 200 which provides the foregoing service the matching server 200 incurs more expenses due to the extension of facilities or more server operation expenses.

Accordingly, the broadcasting receiving apparatus 100 according to the present exemplary embodiment measures the entropy of the image frame, determines a change/non-change of the channel, and receives identification information of the channel from the matching server 200 only when it is determined that the channel has been changed. The channel identifier 50 may generate a digital fingerprint of a video frame by using a feature extracting algorithm such as a scale invariant feature transform (SIFT), a speed up robust feature (SURF), or a maximum stable extremal regions (MSER).

If the channel identifier 50 obtains identification information of the changed channel, the relevant information provider 60 requests the conditional information providing server 400 to provide the conditional information based on the identification information (See FIG. 1). The relevant information provider 60 receives the conditional information and relevant information through the information receiver 40, and processes and displays on the display unit 30 the received relevant information. The relevant information provider 60 may include an application program such as widget that accesses the relevant information providing server 300 and downloads and displays the relevant information, or a graphic user interface (GUI) generator which generates a GUI such as on screen display (OSD) by receiving data. The widget may be plurally provided. The relevant information provider 60 may be installed in the broadcasting receiving apparatus 100 during a manufacturing process of the broadcasting receiving apparatus 100, or downloaded from the relevant information providing server 300 providing the relevant information.

The conditional information denotes information of a condition for providing relevant information corresponding to a broadcasting program. The conditional information according to the present exemplary embodiment includes a broadcasting station ID which transmits a broadcasting signal, an execution condition, an application ID, and relevant information source information which indicates a source of the supplied relevant information as shown in FIG. 3. The execution condition may include broadcasting program ID/channel identification information, a broadcasting time of a broadcasting program, or feature information of a broadcasting program. The broadcasting station ID, broadcasting program ID, broadcasting time of the broadcasting program, or feature information of the broadcasting program may be broadcasting program identification information for identifying the broadcasting program. The application ID denotes information for defining one of a plurality of application programs if the plurality of application programs exists. The relevant information source information may include a server address of the relevant information providing server 300, i.e., URL information.

As described above, if the channel is changed, the conditional information is received. The received conditional information corresponds to information for a predetermined search period after the channel is changed, e.g., a particular period such as one hour or two hours. If the channel is not changed and the search period elapses, conditional information corresponding to a following search period, i.e., a next one hour or two hours may be received.

The conditional information may include information for all channels of the broadcasting signal, or may include only conditional information corresponding to the changed channel. If only the conditional information for the changed channel is received, the relevant information provider 60 may receive the relevant information by using the conditional information.

If the conditional information of all channels is received, the relevant information provider 60 compares channel identification information or broadcasting program ID included in the conditional information and identification information identified by the channel identifier 50. Then, the relevant information provider 60 determines whether there is any conditional information corresponding to the broadcasting signal that is currently broadcast, and if there is any conditional information, accesses the relevant information providing server 300 by using the relevant information source information, i.e., server address. The relevant information is downloaded to the broadcasting receiving apparatus 100 from the relevant information providing server 300.

Figure 4:
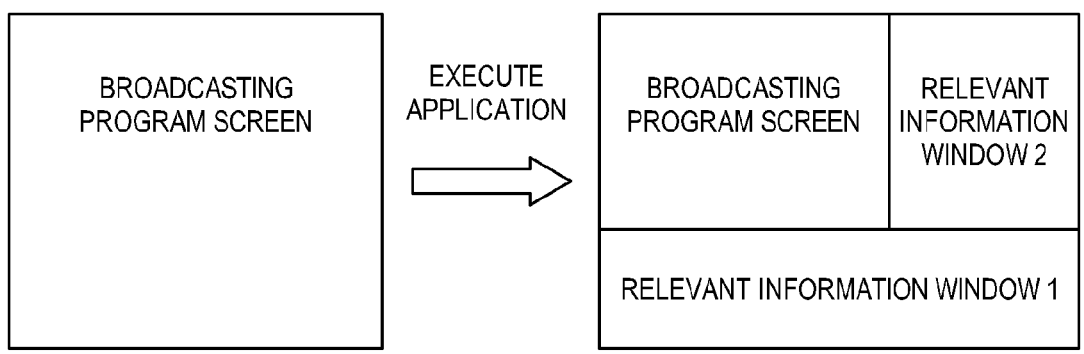
FIG. 4 illustrates relevant information which is displayed in the broadcasting receiving apparatus in FIG. 1.

The relevant information which is transmitted to the broadcasting receiving apparatus 100 is displayed on the display unit 30, an example of which is shown in FIG. 4. The relevant information may be displayed in a margin of the display unit 30 so as not to disturb viewing of the broadcasting program. As shown in FIG. 4, at least two or only one relevant information corresponding to the broadcasting program may be displayed. The relevant information may overlap the broadcasting program screen with transparency or may not be displayed on the display unit 30 according to a user's selection. In this case, the relevant information provider 60 may provide a user with a user interface (UI) to ask a user's opinion on displaying the relevant information upon reception of the relevant information, or display the relevant information in a relevant information window if a user desires to display the relevant information.

The broadcasting receiving apparatus 100 according to the present exemplary embodiment receives an address of a server providing the relevant information as the conditional information for receiving the relevant information, and accesses the server address in real-time to receive the relevant information of the broadcasting program if the broadcasting program that is currently received corresponds to the conditional information. In this case, an individual application program for providing the relevant information corresponding to the individual broadcasting program is not needed, and therefore less data storage space is occupied and the management of the application program is simple. As the communication with the matching server 200 to identify the channel information and receive the conditional information is performed only when the channel is changed, data traffic may be decreased and the facility of the matching server provider may be reduced.

The relevant information according to the present exemplary embodiment may be received from the outside in real-time. Alternatively, according to another exemplary embodiment, the relevant information may be stored in the broadcasting receiving apparatus 100. In this case of storing, the broadcasting receiving apparatus 100 may receive and store the relevant information at a predetermined interval or upon occurrence of a special event.

Figure 5:
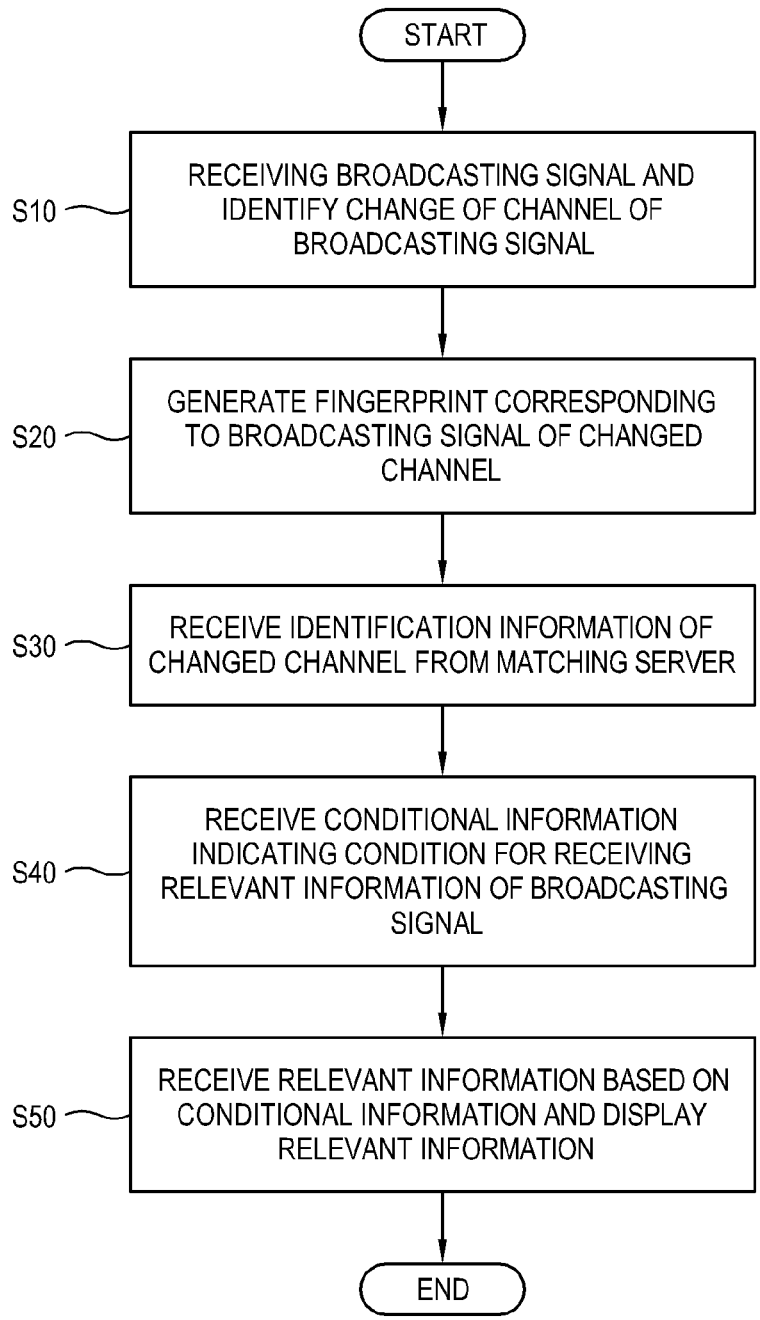
FIG. 5 is a control flowchart showing a method for providing relevant information by the broadcasting receiving apparatus in FIG. 1.

FIG. 5 is a control flowchart of a method for providing the relevant information by the broadcasting receiving apparatus 100 in FIG. 1. The method for providing the relevant information according to the present exemplary embodiment will be described with reference to FIG. 5.

The broadcasting receiving apparatus 100 receives the broadcasting signal including the broadcasting program, and identifies any change in the channel of the broadcasting signal (S10). The process of identifying the change of the channel by the channel identifier 50 is discussed above with respect to FIG. 2.

If it is identified that the channel has been changed, the channel identifier 50 generates a fingerprint corresponding to the broadcasting signal of the changed channel (S20).

The channel identifier 50 receives the identification information of the changed channel from the matching server 200 which receives the broadcasting signal in advance and generates a fingerprint in advance and stores therein the generated fingerprint that corresponds to the broadcasting signal (S30).

The information of the change of the channel and the information of the changed channel is provided to the relevant information provider 60. The relevant information provider 60 receives the conditional information which indicates the condition for receiving the relevant information of the broadcasting signal (S40). The conditional information includes a server address for receiving identification information and relevant information of the channel and broadcasting program.

If there is the relevant information corresponding to the broadcasting signal that is currently displayed, the relevant information provider 60 receives the relevant information from the relevant information providing server 300 by using the relevant information source information (i.e., the server address), and displays the relevant information on the display unit 30 (S50).

The relevant information provider 60 may suspend the provision of the relevant information that is displayed, if the channel of the broadcasting signal that is currently received is changed.

Figure 6:
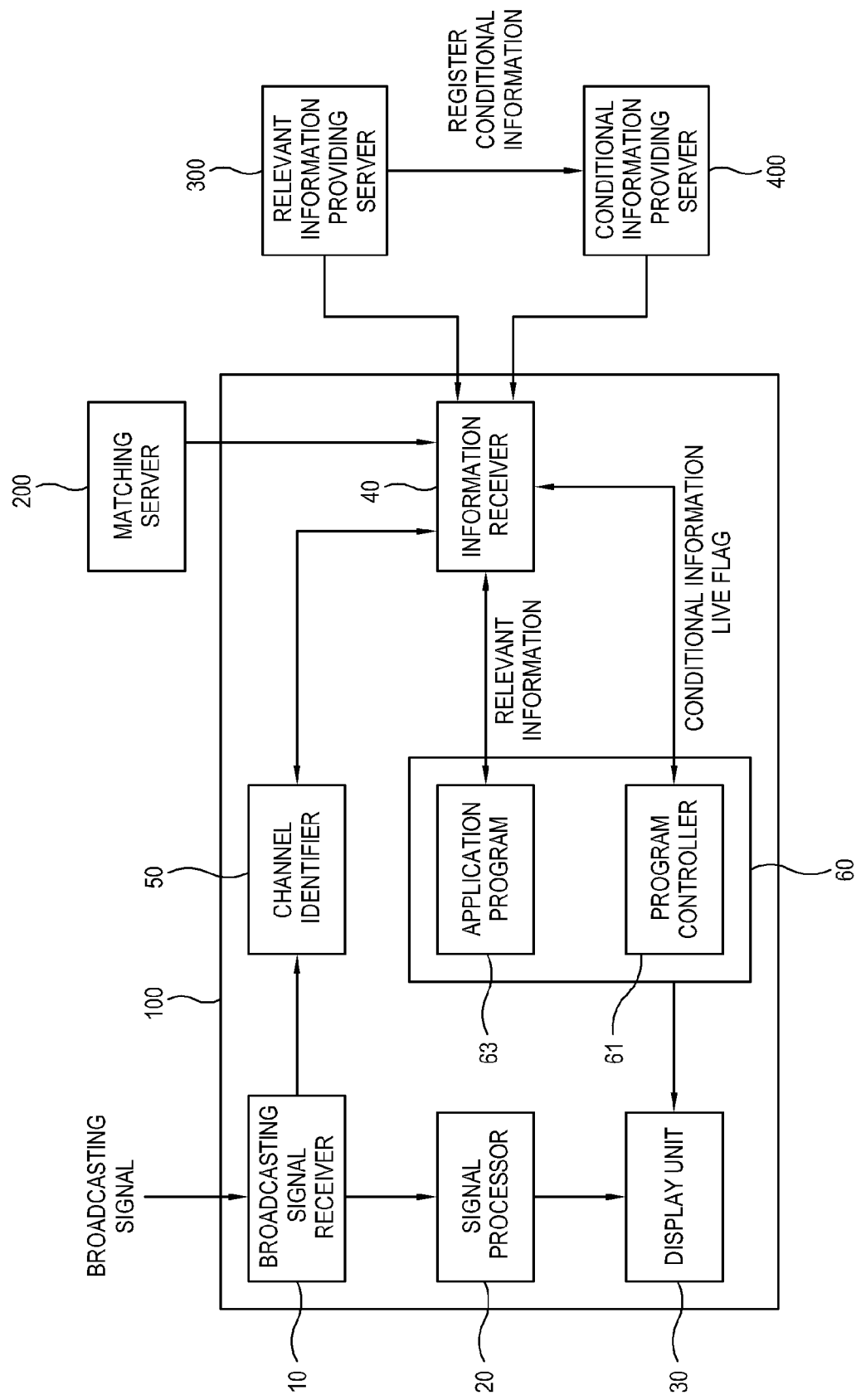
FIG. 6 is a control block diagram of a system which includes a broadcasting receiving apparatus according to another exemplary embodiment.

FIG. 6 is a control block diagram of a system which includes a broadcasting receiving apparatus according to another exemplary embodiment.

The relevant information provider 60 according to the present exemplary embodiment includes an application program 63 and a program controller 61. The application program 63 is installed in the broadcasting receiving apparatus 100 for execution, and denotes an application program that is installed to execute various contents. The application program 63 may be displayed as a GUI on the display unit 30 in the form of a thumb nail or icon. The application program 63 may be driven by an application engine (not shown). The application engine drives the application program 63 so that the application program 63 accesses the server address and receives the relevant information.

The program controller 61 identifies the relevant information source information corresponding to the broadcasting program that is currently displayed, by using the identification information and conditional information transmitted by the channel identifier 50. The conditional information may include information of a plurality of broadcasting programs. The program controller 61 extracts the conditional information corresponding to the broadcasting program that is currently received, among the plurality of conditional information, and extracts the relevant information source information corresponding to the identified program ID or channel ID among the conditional information, and provides the application program 63 with the relevant information source information.

The operation of receiving the conditional information and identifying the relevant information source information and accessing the relevant information providing server 300 and downloading the relevant information may be performed under cooperation between the application program 63 and program controller 61 as shown therein, or performed either by the application program 63 such as widget or by the program controller 61. The block diagram in FIG. 6 is provided for explaining the present exemplary embodiment in a functional manner, and the scope of rights is not limited thereto.

The broadcasting signal is generally supplied to a user according to a certain schedule, but an unexpected event may occur, or the broadcasting signal may be broadcast live all of a sudden. In this case, the relevant information may be generated in real-time even though it is not scheduled for the conditional information.

The conditional information may include a live flag which indicates live broadcasting or an unpredictable broadcasting signal. The conditional information and the relevant information corresponding to the conditional information may be updated in real-time by a broadcasting station or a content provider providing contents such as the relevant information.

The relevant information provider 60 requests the conditional information provider 400 to provide the conditional information in a preset short time, e.g., about every 2 to 3 seconds, and receives and displays the relevant information corresponding to the broadcasting signal of the current channel by using the received conditional information. FIG. 7 is a control flowchart of the method for providing the relevant information if the conditional information includes a live flag as in the present exemplary embodiment.

The program controller 61 identifies whether the received conditional information includes the live flag (S60).

If the conditional information does not include the live flag (S60: NO), the process ends. Alternatively, if the conditional information includes the live flag (S60: YES), the program controller 61 sets the relevant information providing mode as a live mode to be distinguished from a normal mode (S70).

If the live mode is set, the program controller 61 enables the application program which supports the live mode (S80).

The program controller 61 accesses the conditional information providing server 400 every preset short time and receives the conditional information (S90), and correspondingly thereto, the application program 63 accesses the relevant information providing server 300 and downloads the relevant information (S100).

According to another exemplary embodiment, if the conditional information includes the live flag, the relevant information provider 60 may access the relevant information providing server 300 at a preset interval and download the relevant information even in the case where there is no update for the conditional information. If a server address relating to the broadcasting signal that is received through a particular channel is stored in advance, the relevant information provider 60 may access the server address. Otherwise, the relevant information provider 60 may access the server address that is received together with the live flag, and continuously receive the relevant information from the relevant information providing server 300 without confirming the conditional information of the conditional information providing server 400.

In the case of a live broadcasting, the broadcasting time of a broadcasting program changes sharply due to its nature, and a forecast of an event is difficult. Thus, even if the relevant information is used, real-time response may not be available. In the present exemplary embodiment, the live mode is set, and the conditional information and relevant information are updated every shortest time corresponding to the live broadcasting. Then, advertisement and real-time data which are suitable for the live broadcasting may be provided to a user, and a service which satisfies both the relevant information provider and user may be provided.

According to another exemplary embodiment, the relevant information provider 60 may include a plurality of application programs. In this case, the program controller 61 may control one of the plurality of application programs to receive and provide the relevant information. If the broadcasting receiving apparatus 100 includes a plurality of application programs, the conditional information transmitted to the broadcasting receiving apparatus 100 may include an application ID to select one of at least two application programs. If the broadcasting receiving apparatus 100 includes a single application program as in the foregoing exemplary embodiments, the application ID may be set or may not be set as a default. However, if the application programs are plurally provided, the broadcasting receiving apparatus 100 selects an application program to provide the relevant information, and the application engine may provide the relevant information by controlling the application program selected according to the application ID.

As described above, a broadcasting receiving apparatus and a method for providing broadcasting signal relation information according to one or more exemplary embodiments displays in real-time relevant information of a broadcasting signal even if a broadcasting program is not identified.

Further, a broadcasting receiving apparatus and a method for providing broadcasting signal relation information according to one or more exemplary embodiments provides relevant information of a broadcasting signal by reducing a data traffic with a matching server that identifies a channel.

Further, a broadcasting receiving apparatus and a method for providing broadcasting signal relation information according to one or more exemplary embodiments provides in real-time relevant information of a live broadcasting or an unpredictable broadcasting signal.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A broadcasting receiving apparatus comprising:
 a broadcasting signal receiver configured to receive a broadcasting signal;
 a communication unit configured to communicate with a server;
 a controller configured to set an operation mode as a predefined mode based on the received broadcasting signal, to connect to the server more frequently than when the operation mode is set as a normal mode, to receive at least one content corresponding to the broadcasting signal from the server, and to display the received at least one content.

2. The broadcasting receiving apparatus according to claim 1, wherein the broadcasting signal comprises status information which informs whether the received broadcasting signal is a live broadcasting signal or an unpredictable broadcasting signal, and
 wherein the controller determines the operation mode based on the status information.

3. The broadcasting receiving apparatus according to claim 1, wherein the predefined mode is a live mode.

4. The broadcasting receiving apparatus according to claim 1, wherein the controller displays the received at least one content in real time.

5. The broadcasting receiving apparatus according to claim 1, wherein the controller determines a change of a channel of the broadcasting signal, generates identification information corresponding to the changed channel of the broadcasting signal in response to the change of the channel of the broadcasting signal, and transmits the identification information to the server.

6. The broadcasting receiving apparatus according to claim 5, wherein the controller determines the change of the channel of the broadcasting signal by analyzing images of the broadcasting signal captured at a predetermined interval.

7. The broadcasting receiving apparatus according to claim 5, wherein the controller receives conditional information which includes a condition for receiving the at least one content corresponding to the broadcasting signal from the server based on the transmitted identification information.

8. The broadcasting receiving apparatus according to claim 7, wherein the conditional information comprises a server address for a content providing server which provides the at least one content corresponding to the broadcasting signal.

9. The broadcasting receiving apparatus according to claim 8, wherein the controller receives the at least one content from the content providing server based on the received conditional information.

10. The broadcasting receiving apparatus according to claim 5, wherein the controller receives the at least one content corresponding to the transmitted identification information, from the server.

11. The broadcasting receiving apparatus according to claim 1, wherein the controller displays images of the broadcasting signal and the received at least one content simultaneously in real time.

12. The broadcasting receiving apparatus according to claim 11, wherein the at least one content overlaps the images of the broadcasting signal with transparency, or is not displayed, according to a user's input.

13. The broadcasting receiving apparatus according to claim 7, wherein the predefined mode is a live mode, and wherein controller executes an application which supports the live mode when the live mode is set, accesses the server every preset time, receives the conditional information from the server, and receives the at least one content based on the conditional information.

14. A method of receiving a broadcasting signal in a broadcasting receiving apparatus, the method comprising:
 receiving a broadcasting signal;
 setting an operation mode as a predefined mode based on the received broadcasting signal;
 connecting to the server more frequently than when the operation mode is set as a normal mode;
 receiving at least one content corresponding to the broadcasting signal from the server; and
 displaying the received at least one content.

15. The method according to claim 14, wherein the broadcasting signal comprises status information which informs whether the received broadcasting signal is a live broadcasting signal or an unpredictable broadcasting signal, and wherein the method further comprises determining the operation mode based on the status information.

16. The method according to claim 14, wherein the predefined mode is a live mode.

17. The method according to claim 14, further comprising: displaying the received at least one content in real time.

18. The method according to claim 14, further comprising: determining a change of a channel of the broadcasting signal;

generating identification information corresponding to the changed channel of the broadcasting signal in response to the change of the channel of the broadcasting signal; and transmitting the identification information to the server.

19. The method according to claim 18, further comprising: determining the change of the channel of the broadcasting signal by analyzing images of the broadcasting signal captured at a predetermined interval.

20. The method according to claim 18, further comprising: receiving conditional information which includes a condition for receiving the at least one content corresponding to the broadcasting signal from the server based on the transmitted identification information.

21. The method according to claim 20, wherein the conditional information comprises a server address for a content providing server which provides the at least one content corresponding to the broadcasting signal.

22. The method according to claim 21, further comprising: receiving the at least one content from the content providing server based on the received conditional information.

23. The method according to claim 18, further comprising: receiving the at least one content corresponding to the transmitted identification, information from the server.

24. The method according to claim 18, further comprising: displaying images of the broadcasting signal and the received at least one content simultaneously in real time.

25. The method according to claim 24, wherein the at least one content overlaps the images of the broadcasting signal with transparency, or is not displayed, according to a user's input.

26. The method according to claim 20, wherein the predefined mode is a live mode, and the method further comprises:

executing an application which supports the live mode when the live mode is set;

accessing the server every preset time;

receiving the conditional information from the server; and receiving the at least one content based on the conditional information.

* * * * *